United States Patent
Kweon et al.

(10) Patent No.: US 10,368,212 B2
(45) Date of Patent: Jul. 30, 2019

(54) METHOD AND APPARATUS FOR PROVIDING AUGMENTED REALITY SERVICES

(71) Applicant: Samsung Electronics Co., Ltd., Gyeonggi-do (KR)

(72) Inventors: Kisuk Kweon, Suwon-si (KR); Joohyung Lee, Gwacheon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/624,675

(22) Filed: Jun. 15, 2017

(65) Prior Publication Data

US 2017/0366951 A1 Dec. 21, 2017

(30) Foreign Application Priority Data

Jun. 15, 2016 (KR) ........................ 10-2016-0074578

(51) Int. Cl.
*G06F 3/01* (2006.01)
*G06F 3/14* (2006.01)
(Continued)

(52) U.S. Cl.
CPC .............. *H04W 4/185* (2013.01); *G06F 3/011* (2013.01); *G06F 3/14* (2013.01); *G06F 3/147* (2013.01);
(Continued)

(58) Field of Classification Search
CPC .................................................. G06T 19/006
See application file for complete search history.

(56) References Cited

U.S. PATENT DOCUMENTS 6,118,456 A 9/2000 Cooper
8,803,916 B1* 8/2014 Paczkowski ............ G06T 11/60
345/629

(Continued)

FOREIGN PATENT DOCUMENTS

WO 2015166095 A1 11/2015

OTHER PUBLICATIONS

Foreign Communication from Related Counterpart Application; PCT Patent Application No. PCT/KR2017/006068; International Search Report dated Sep. 21, 2017; 3 pages.

(Continued)

*Primary Examiner* — Jeffery A Brier

(57) ABSTRACT

The present disclosure relates to a communication technique and system for combining 5G communication systems with IoT technologies to achieve a higher data rate beyond 4G systems. The present disclosure can be applied to intelligent services (e.g., smart homes, smart buildings, smart cities, smart or connected cars, healthcare, digital education, retail businesses, and security and safety related services) on the basis of 5G communication technologies and IoT related technologies. The disclosure provides a method for an electronic device to provide an augmented reality service. The method may include receiving content related information for an object; transmitting a request for at least one content among multiple contents related to the object based on filtering information and the content related information, and outputting at least one content received in response to the request in a virtual region.

20 Claims, 20 Drawing Sheets

(51) Int. Cl.
*H04W 4/02* (2018.01)
*H04W 4/18* (2009.01)
*H04W 4/30* (2018.01)
*G06F 3/147* (2006.01)
*G06T 19/00* (2011.01)
*H04L 29/06* (2006.01)
*H04L 29/08* (2006.01)
*G06F 16/957* (2019.01)

(52) U.S. Cl.
CPC ...... *G06F 16/9574* (2019.01); *G06F 16/9577* (2019.01); *G06T 19/006* (2013.01); *H04L 67/04* (2013.01); *H04L 67/06* (2013.01); *H04L 67/38* (2013.01); *H04W 4/02* (2013.01); *H04W 4/18* (2013.01); *H04W 4/30* (2018.02); *G09G 2370/12* (2013.01); *G09G 2370/16* (2013.01); *H04L 67/2847* (2013.01); *H04L 67/303* (2013.01); *H04W 4/025* (2013.01); *H04W 4/027* (2013.01)

(56) References Cited

U.S. PATENT DOCUMENTS

| | | |
|---|---|---|
| 2012/0115513 A1 | 5/2012 | Han |
| 2012/0166578 A1* | 6/2012 | Hong .................... G06Q 10/06 709/217 |
| 2014/0073358 A1 | 3/2014 | Sridhar et al. |
| 2015/0170220 A1 | 6/2015 | Gupta et al. |
| 2015/0242443 A1 | 8/2015 | Grue et al. |
| 2015/0296274 A1 | 10/2015 | Good et al. |
| 2016/0133058 A1 | 5/2016 | Kaino et al. |
| 2016/0142902 A1 | 5/2016 | Ramamurthi et al. |

OTHER PUBLICATIONS

European Patent Office, "Supplementary European Search Report," Application No. EP17813537.2, dated Nov. 26, 2018, 7 pages.

* cited by examiner

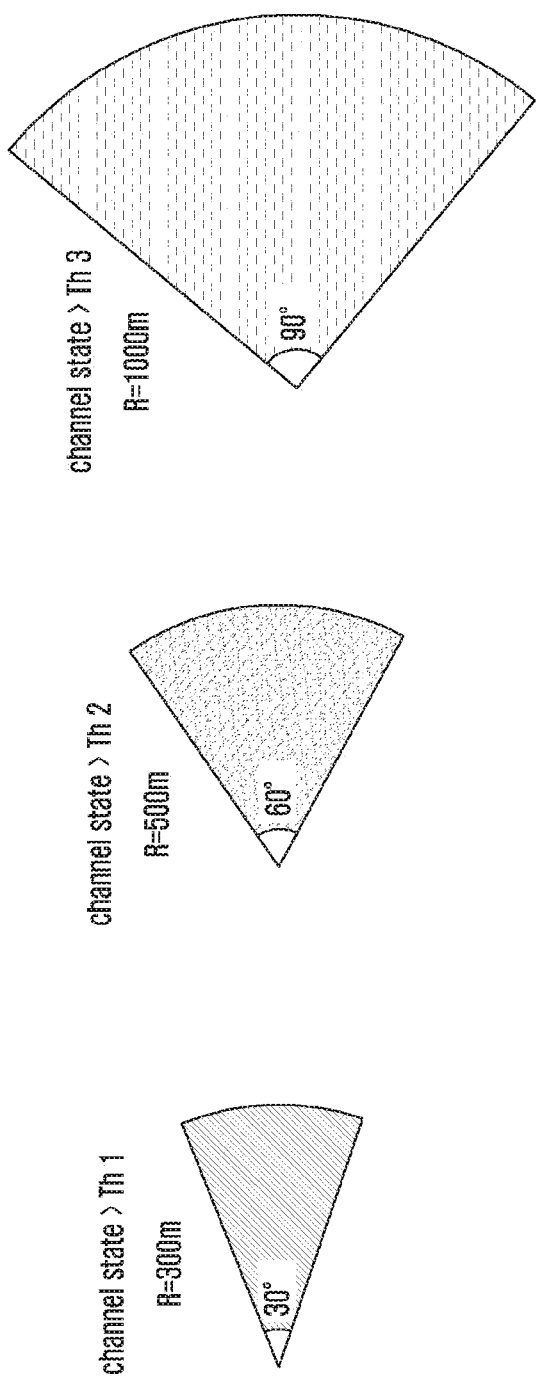

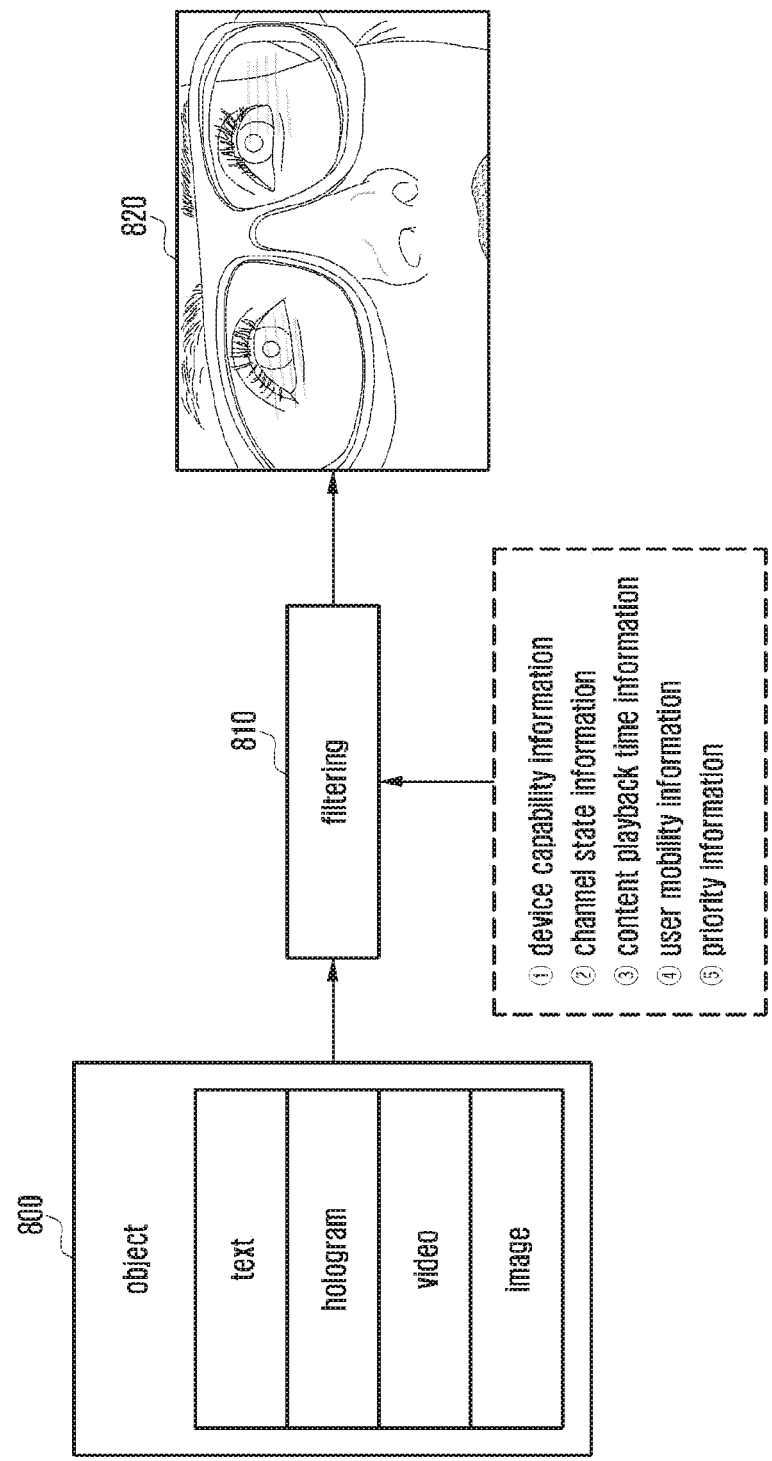

METHOD AND APPARATUS FOR PROVIDING AUGMENTED REALITY SERVICES

CROSS-REFERENCE TO RELATED APPLICATION(S) AND CLAIM OF PRIORITY

The present application is related to and claims benefit under 35 U.S.C. § 119(a) of a Korean patent application filed on Jun. 15, 2016 in the Korean Intellectual Property Office and assigned Serial No. 10-2016-0074578, the entire disclosure of which is hereby incorporated by reference.

TECHNICAL FIELD

The present disclosure relates to a technology for providing augmented reality services. More particularly, the present disclosure relates to a method and apparatus for selectively providing contents related to a specific object.

BACKGROUND

To cope with the increasing demand for wireless data traffic after commercialization of 4G communication systems, active efforts are underway to develop enhanced 5G or pre-5G communication systems. As such, 5G or pre-5G communication systems are referred to as beyond 4G communication systems or post LTE systems. To achieve high data rates, use of the extremely high frequency (mmWave) band (e.g. 60 GHz band) is expected in a 5G communication system. To reduce propagation pathloss and to increase propagation distance at the mmWave band, use of various technologies such as beamforming, massive MIMO, full dimensional MIMO (FD-MIMO), array antenna, analog beamforming and large scale antenna are under discussion for 5G communication systems. To enhance system networks, various technologies such as evolved or advanced small cell, cloud radio access network (cloud RAN), ultra-dense network, device-to-device (D2D) communication, wireless backhaul, moving network, cooperative communication, Coordinated Multi-Points (CoMP) and interference cancellation are under development for 5G communication systems. In addition, for 5G communication systems, hybrid FSK and QAM modulation (FQAM) and sliding window superposition coding (SWSC) are under development for advanced coding modulation (ACM), and filter bank multi carrier (FBMC), non-orthogonal multiple access (NOMA) and sparse code multiple access (SCMA) are under development for advanced access.

Meanwhile, the Internet is evolving from a human centered network where humans create and consume information into the Internet of Things (IoT) where distributed elements or things process and exchange information. Big data processing through cloud servers and IoT technology are being combined into the Internet of Everything (IoE). To realize IoT services, base technologies such as sensing, wired/wireless communication and network infrastructure, service interfacing and security are needed, and technologies interconnecting things such as sensor networks, Machine-to-Machine (M2M) or Machine Type Communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine or machine type communication are being realized by use of 5G communication technologies including beamforming, MIMO and array antennas. Application of cloud RANs to big data processing described above may be an instance of convergence of 5G communication technology and IoT technology.

An augmented reality (AR) service may refer to a service that blends real-world images and virtual images together to enable real-time interaction in a three-dimensional context.

Currently, three approaches are mainly used for research on AR services: sensor-based AR, vision-based AR, and hybrid AR.

First, in sensor-based AR, the current location is directly estimated using sensors such as a GPS receiver, gyro sensor, and acceleration sensor, and a location-based AR service may be provided accordingly. Sensor-based AR may make it easy to develop and implement a service through direct use of sensors. However, sensor-based AR service may be not suitable for indoor environments and may produce an erroneous result.

Second, in vision-based AR, an AR service may be provided by use of computer image recognition. A scene captured by an AR device (e.g. terminal) may be analyzed and recognized to provide AR content suitable for the AR device. Vision-based AR may produce a relatively accurate result, but it may be difficult to develop a service using vision-based AR. In addition, vision-based AR requires extra computing power for image recognition and entails additional latency.

Third, in hybrid AR, it is possible to combine advantages of sensor-based AR with those of vision-based AR. That is, hybrid AR may use both image information and sensor information, where sensors may be used for macro tracking and image recognition may be used for more accurate estimation. Hybrid AR attracts attention for much research in recent years, and it may be relatively difficult to develop a service using hybrid AR.

Meanwhile, to realize an AR service, it is necessary for the server to provide AR contents to an AR device with suitable interaction between the AR device and the server.

SUMMARY

To address the above-discussed deficiencies, it is a primary object to reduce the latency of AR contents being delivered from the server to the AR device for AR service provisioning.

In accordance with an aspect of the present disclosure, there is provided a method for an electronic device to provide an augmented reality service. The method may include: receiving content related information for an object; sending a request for at least one content among multiple contents related to the object on the basis of filtering information and the content related information; and outputting at least one content received in response to the request in a virtual region.

In accordance with another aspect of the present disclosure, there is provided a method for a server to provide an augmented reality service. The method may include: sending, in response to a request for content related information related to an object, content related information to an electronic device; and sending, in response to a request for at least one content among multiple contents indicated by the content related information, at least one content to the electronic device, wherein the at least one content may be selected on the basis of filtering information and the content related information.

In accordance with another aspect of the present disclosure, there is provided an electronic device capable of providing an augmented reality service. The electronic device may include: a display; a communication unit; and a processor electrically connected with the display and the communication unit, wherein the processor controls a process of receiving content related information for an object through the communication unit, sending a request for at least one content among multiple contents related to the object through the communication unit on the basis of filtering information and the content related information, and outputting at least one content received in response to the request in a virtual region of the display.

In accordance with another aspect of the present disclosure, there is provided a server capable of providing an augmented reality service. The server may include: a communication unit; and a processor electrically connected with the communication unit, wherein the processor may control a process of sending, in response to a request for content related information related to an object, content related information to an electronic device through the communication unit, and sending, in response to a request for at least one content among multiple contents indicated by the content related information, at least one content to the electronic device through the communication unit, wherein the at least one content may be selected on the basis of filtering information and the content related information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7A illustrates object prefetching according to an embodiment of the present disclosure.

FIG. 8 illustrates concepts for delivering low-latency content in an AR service according to an embodiment of the present disclosure.

DETAILED DESCRIPTION

FIGS. 1 through 15D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. disclosure In the present disclosure, augmented reality (AR) implemented by the electronic device may be used to provide various services. When an AR service is provided by the electronic device, real objects and virtual objects may have various relationships. In one embodiment, a virtual object may coexist with a real object in the same space where the same physical laws apply to the virtual object acting like a real object and the real object. For example, when a virtual TV is placed in front of a bed in a room in an AR scene, as the part of the bed viewed by the user changes according to the location of the user, the scale of the virtual TV may be rendered like a real TV depending upon the location of the user. In addition, a virtual object may be displayed so as to overlap a real object. A virtual object may be displayed so as not to overlap a real object.

Figure 1:
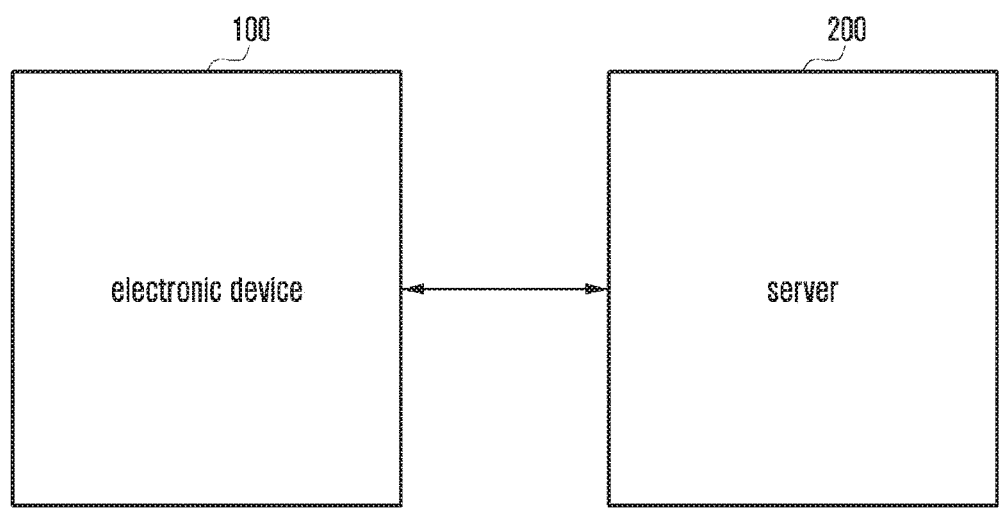
FIG. 1 illustrates the linkage between an electronic device and a server according to an embodiment of the present disclosure.

FIG. 1 illustrates the linkage between an electronic device and a server according to an embodiment of the present disclosure.

Referring to FIG. 1, the electronic device 100 may send and receive data to and from the server 200.

In various embodiments, each of the electronic device 100 and the server 200 may be at least one of a smartphone, tablet personal computer, mobile phone, video phone, e-book reader, desktop personal computer, laptop personal computer, netbook computer, personal digital assistant (PDA), portable multimedia player (PMP), MP3 player, mobile medical instrument, camera, and wearable device (such as a head-mounted device (HMD) like electronic eyeglasses, electronic clothing, electronic bracelet, electronic necklace, electronic appcessory, electronic tattoo, or smartwatch).

Each of the electronic device 100 and the server 200 may be a smart home appliance. For example, the smart home appliance may be at least one of a television, digital video disk (DVD) player, audio player, refrigerator, air conditioner, cleaner, oven, microwave oven, washing machine, air cleaner, set-top box, TV box (e.g. SAMSUNG HOME-SYNC™, APPLE TV®, or GOOGLE TV®), game console, electronic dictionary, electronic key, camcorder, and electronic frame.

Each of the electronic device 100 and the server 200 may be at least one of a medical instrument (e.g. Magnetic Resonance Angiography (MRA), Magnetic Resonance Imaging (MM), Computed Tomography (CT), tomograph, or ultrasound machine), a navigation device, a Global Positioning System (GPS) receiver, an event data recorder (EDR), a flight data recorder (FDR), an automotive infotainment device, electronic equipment for ships (e.g. marine navigation system, or gyro compass), avionics, a security device, an automotive head unit, an industrial or home robot, an automatic teller machine (ATM) of a financial institution, and a Point of Sales (POS) device of a store.

Each of the electronic device 100 and the server 200 may be at least one of a part of furniture or a building/a structure, an electronic board, an electronic signature receiving device, a projector, and measurement equipment (e.g. instrument for measuring water, power, gas, or radio waves). In various embodiments of the present disclosure, the electronic device 100 may be one of the above-mentioned devices or a combination thereof. The electronic device 100 may be a flexible device. It may be apparent to a person skilled in the art that the electronic device 100 is not limited to the above-mentioned devices.

The electronic device 100 may capture an image from the outside and recognize and track a real object in the image. The server 200 may store a virtual object corresponding to the real object and information on the virtual object. The electronic device 100 may send information on the real object to the server 200 and receive a corresponding virtual object from the server 200. A real object may correspond to one or more virtual objects.

In the present specification, a real object is referred to as an object, and a virtual object corresponding to a real object is referred to as content. Information about a virtual object (e.g. type, size, and playback time of a virtual object) is referred to as content related information.

In one embodiment, the electronic device 100 may send the server 200 a request for content related information as to a given object first, and send the server 200 a request for at least one content selected on the basis of the content related information and filtering information. Thereby, it is possible to reduce the latency due to transmission of too many contents.

In one embodiment, the electronic device 100 may receive a content for an object in advance according to the location, movement speed, and channel state of the user. This may be referred to as object prefetching. For example, the electronic device 100 may specify a prefetching zone on the basis of the channel state, and may perform object prefetching for an object belonging to the prefetching zone.

Figure 2:
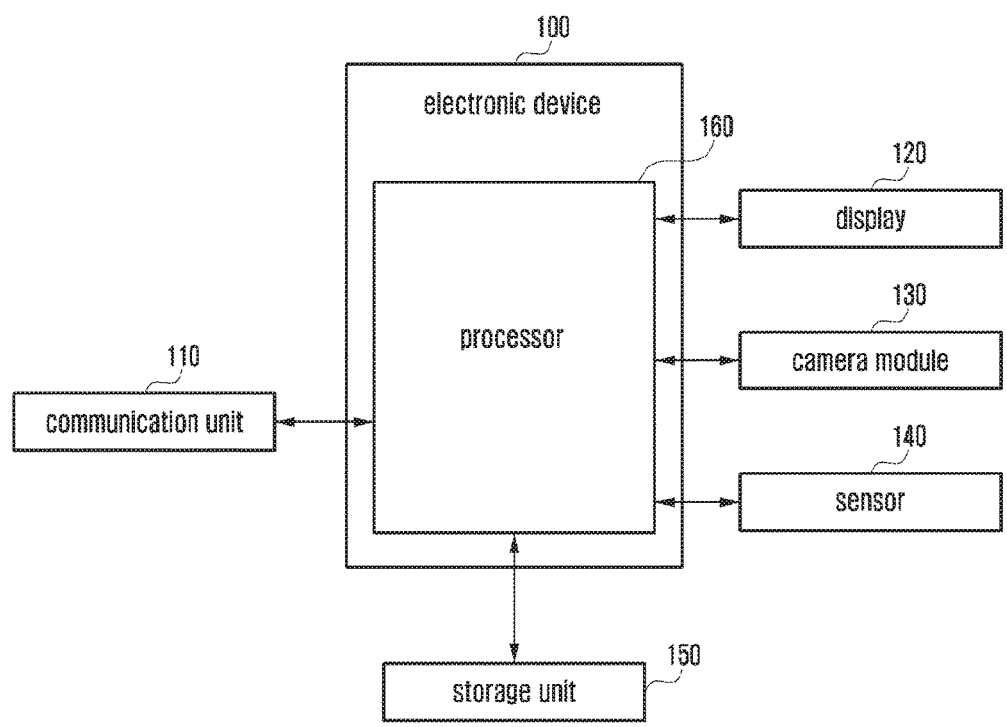
FIG. 2 illustrates the electronic device according to an embodiment of the present disclosure.

FIG. 2 illustrates the electronic device 100 according to an embodiment of the present disclosure.

In various embodiments, the electronic device 100 may include a communication unit 110, a display 120, a camera module 130, a sensor 140, a storage unit 150, and a processor 160. As the components shown in FIG. 2 are not indispensable, a new component may be added to the electronic device 100 and an existing component of the electronic device 100 may be omitted. For example, any component other than the processor 160 may operate in cooperation with the electronic device 100 as a separate module. The electronic device 100 may further include an audio module and an input module in another embodiment.

In one embodiment, the communication unit 110 may communicate with an external device (e.g. server 200 or another electronic device). The communication unit 110 may connect to a network through wired or wireless communication to communicate with an external device. Wireless communication may include cellular communication using at least one of Long Term Evolution (LTE), Code Division Multiple Access (CDMA), and Global System for Mobile Communications (GSM). Wireless communication may include short-range communication such as WI-FI® and BLUETOOTH®. Wired communication may include communication based on Universal Serial Bus (USB), High Definition Multimedia Interface (HDMI), and power line communication.

In one embodiment, the display 120 may output a screen. The display 120 may be realized using, for example, a liquid crystal display (LCD), light emitting diodes (LED), organic light emitting diodes (OLED), and electronic paper. To deliver an AR service, the display 120 may output a real object (object in the present specification) in a real world region and output a virtual object (content in the present specification) in a virtual region.

In one embodiment, the camera module 130 may capture still images and moving images. The camera module 130 may include an image sensor (e.g. front sensor or rear sensor), a lens, and a 3D depth sensor. The camera module 130 may support at least one of functions related to 4 MP camera resolution, 3D depth information acquisition for an external image, eye tracking, binocular focus adjustment (adjustable optics), and movement detection and tracking. A sensor (e.g. electrooculography sensor) installed at a portion of the electronic device 100 may be used to track the line of vision of the user. The camera module 130 may further include, for example, a micro camera. A focus adjuster installed at a portion of the electronic device 100 may be used to adjust the distance to the lens and the position of the display 120. In addition, the camera module 130 may support the functionality of Google's Tango camera.

In one embodiment, to provide an AR service, the sensor 140 may include a GPS receiver, a gyro sensor, and an acceleration sensor. The sensor 140 may be used to obtain mobility information of the user such as location information and movement speed information.

In one embodiment, the storage unit 150 may store program instructions and data.

In one embodiment, the processor 160 may be electrically connected with the communication unit 110, the display 120, the camera module 130, the sensor 140, and the storage unit 150, and may control each thereof. The processor 160 may use the camera module 130 and the sensor 140 to capture an external image and to recognize and track an object in the external image.

In one embodiment, the processor 160 may send the server 200 a request for content related information for a recognized object through the communication unit 110. Then, the processor 160 may send the server 200 a request for at least one content selected on the basis of filtering information and the content related information through the communication unit 110.

Alternatively, content filtering may be performed by the server 200. In this case, the processor 160 may send information on a recognized object and filtering information to the server 200, and receive at least one content selected by the server 200 through filtering via the communication unit 110.

The processor 160 may output the content received from the server 200 in the virtual region of the display 120. When the content contains voice data, the processor 160 may output the voice data through an audio output unit (not shown). When the content contains various types of data, the processor 160 may output the data through corresponding output units.

The content related information is information regarding multiple contents associated with an object, and may include information regarding the identifier, type, size or playback time for each content.

The filtering information is information usable for filtering contents, and may include pieces of information such as capability information of the electronic device, channel state information, user mobility information, and priority information.

The capability information is information indicating capabilities of the electronic device with respect to an AR service, and may include at least one of information on AR service supportability and information on the types of supported contents. Content types may include image, hologram, video, and text.

The channel state information is information indicating the connectivity state of the network leading to the server 200, and may include at least one of RSRP, RSRQ, and average TCP throughput. The processor 160 may measure the channel state information.

The user mobility information may include information regarding the location, movement speed, and movement direction of the user. The processor 160 may obtain the user mobility information by use of the sensor 140 (e.g. GPS receiver, gyro sensor and/or acceleration sensor).

The priority information is information on priorities assigned to individual contents. Priorities may be assigned according to preset settings or user input.

Meanwhile, in one embodiment, the processor 160 may perform object prefetching on the basis of the channel state information and user mobility information. For example, the processor 160 may determine the prefetching zone according to the channel state in consideration of the location and movement speed of the user. If the channel state is good, the prefetching zone may be increased; and if the channel state is poor, the prefetching zone may be decreased. The processor 160 may perform prefetching for an object within the prefetching zone. The processor 160 may subdivide the prefetching zone into multiple subzones with priorities and perform prefetching according to the priority of a specific subzone. For example, for an object belonging to a subzone with a high priority, the processor 160 may prefetch a larger number of contents, a larger content, or a content of a type with a larger size.

The operation of the electronic device 100 will be described in more detail later.

Figure 3:
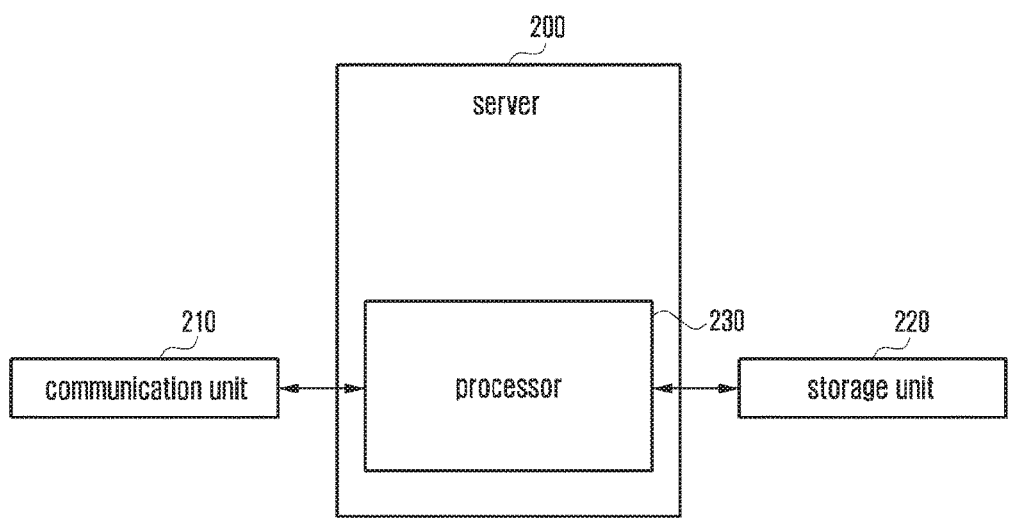
FIG. 3 illustrates the server according to an embodiment of the present disclosure.

FIG. 3 illustrates the server 200 according to an embodiment of the present disclosure.

In various embodiments, the server 200 may include a communication unit 210, a storage unit 220, and a processor 230. As the components shown in FIG. 3 are not indispensable, a new component may be added to the server 200 and an existing component of the server 200 may be omitted.

In one embodiment, the communication unit 210 may communicate with an external device (e.g. electronic device 100 or another electronic device). The communication unit 110 may connect to a network through wired or wireless communication to communicate with an external device. Wireless communication may include cellular communication using at least one of Long Term Evolution (LTE), Code Division Multiple Access (CDMA), and Global System for Mobile Communications (GSM). Wireless communication may include short-range communication such as WI-FI® and BLUETOOTH®. Wired communication may include communication based on Universal Serial Bus (USB), High Definition Multimedia Interface (HDMI), and power line communication.

In one embodiment, the storage unit 220 may store program instructions and data. The storage unit 220 may store information regarding AR services. The storage unit 220 may include a database storing multiple contents and associated content related information corresponding to each of multiple objects.

In one embodiment, the processor 230 may be electrically connected with the communication unit 210 and the storage unit 220, and may control each thereof.

In one embodiment, when a request for content related information associated with a recognized object is received from the electronic device 100, the processor 230 may retrieve content related information associated with the object from the database of the storage unit 220 and send the content related information to the electronic device 100 through the communication unit 210. Thereafter, when a request for at least one content selected on the basis of filtering information and the content related information is received from the electronic device 100, the processor 230 may send the requested content to the electronic device 100 through the communication unit 210.

Alternatively, content filtering may be performed by the server 200. In this case, the processor 230 may receive information on a recognized object and filtering information from the electronic device 100, filter the contents on the basis of the received information, and send a content selected through filtering to the electronic device 100 via the communication unit 210.

Figure 4:
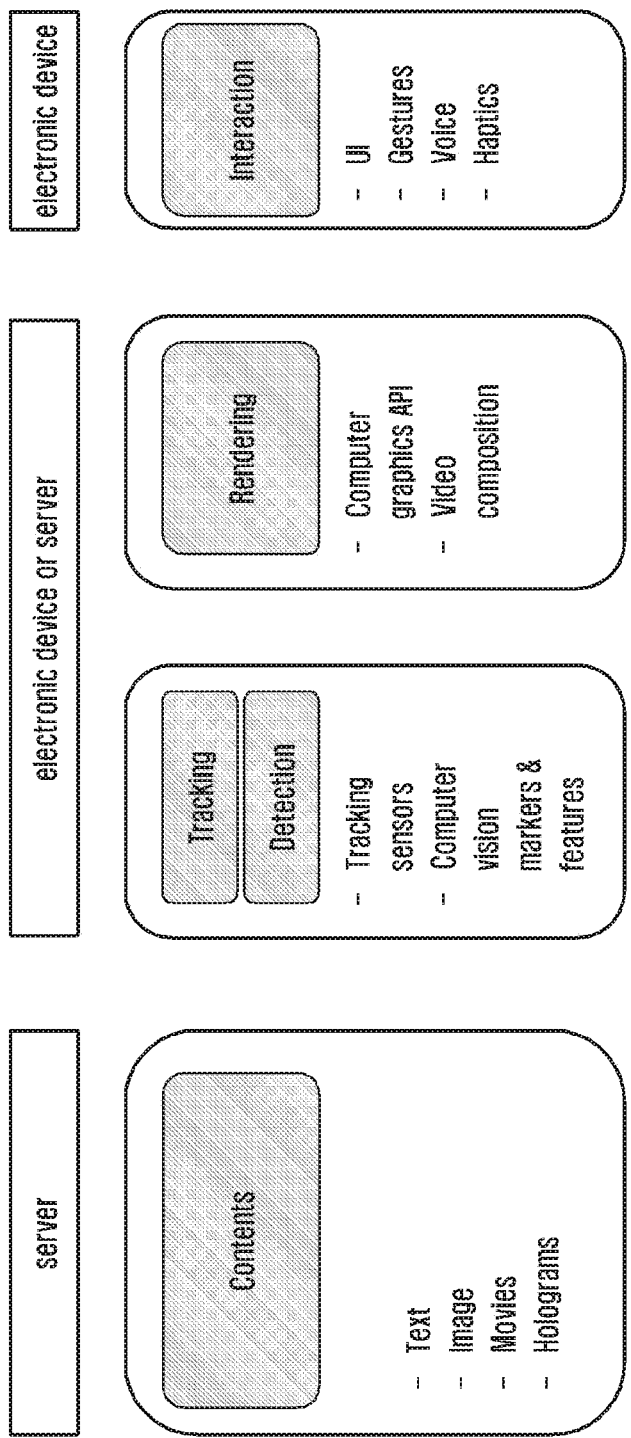
FIG. 4 illustrates an AR service structure of the electronic device and the server.

FIG. 4 illustrates an AR service structure of the electronic device (e.g. electronic device 100) and the server (e.g. server 200).

Referring to FIG. 4, an AR service may be realized on the basis of a content database, object detection and tracking, content rendering, and interaction. The content database for an AR service may be stored in the server. Object detection and tracking, and content rendering may be performed by the electronic device or the server. Interaction with the user or the server may be performed by the electronic device.

AR contents may include various types of data such as text, image, video or movie, and hologram. Object detection and tracking may be carried out through vision-based operation and sensor-based operation. A virtual object containing a content may be rendered and blended with real world images for presentation.

Figure 5:
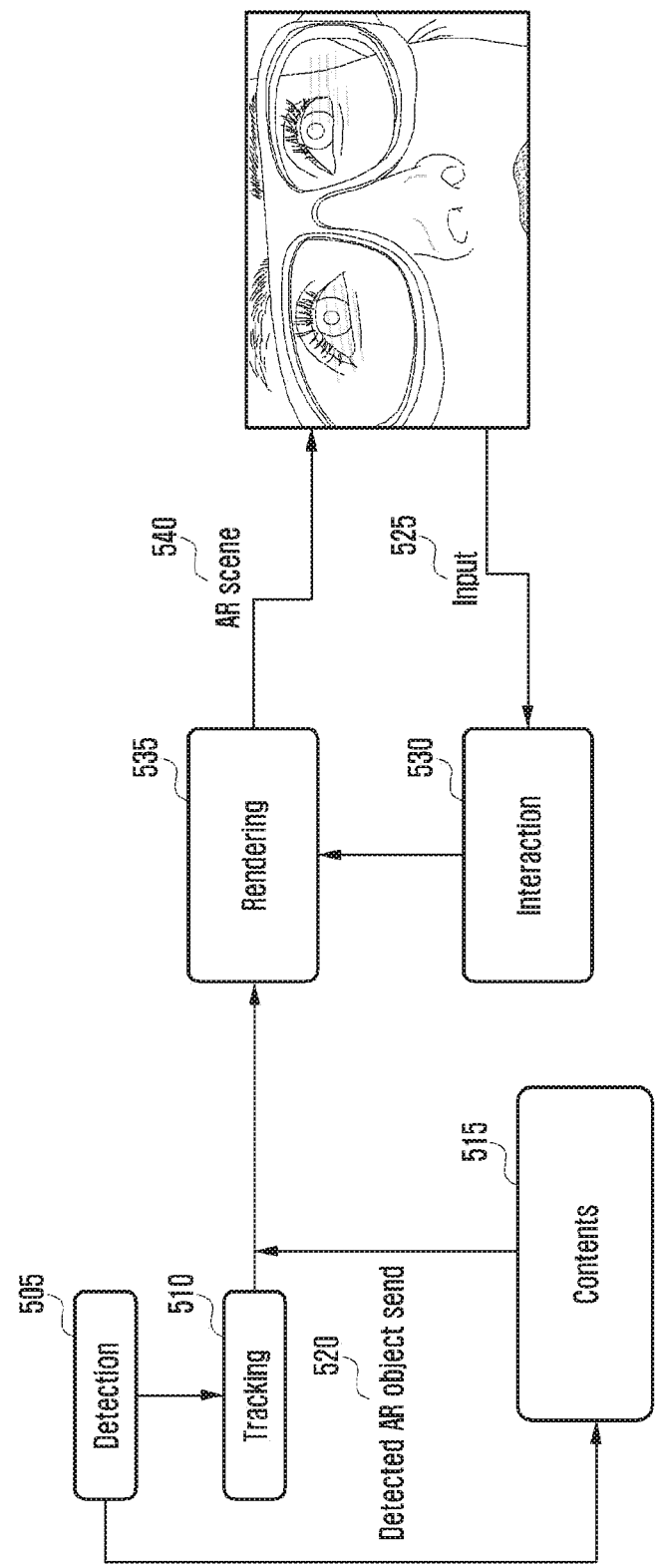
FIG. 5 illustrates provision of an AR service.

FIG. 5 illustrates provision of an AR service. FIG. 5 describes operations of the electronic device and the server involved in the AR service depicted in FIG. 4.

Referring to FIG. 5, at least one object may be recognized in a real-world image as indicated by indicia 505. The recognized object may be tracked as indicated by indicia 510. There may be a database storing content information for objects as indicated by indicia 515. At least one content corresponding to the recognized object may be retrieved from the database as indicated by indicia 520. The retrieved at least one content may be rendered as indicated by indicia 535. The rendered content may be blended with the real world image for output as indicated by indicia 540. When user input is received as indicated by indicia 525, a corresponding interaction may be offered as indicated by indicia 530 and this interaction may be reflected again in rendering operation as indicated by indicia 535.

As described above, an AR service may be carried out through interaction between individual operations. So far, most AR researches have focused on object detection and tracking, and content rendering. However, the problem of real-timeness has become to the fore in recent attempts for AR service commercialization as a transmission delay has been observed during content transmission. That is, contents may include various types of data such as text, voice, image, video, and hologram. For AR service realization, it has been found that low-latency delivery of various types of contents to the user is very important.

For example, assume that the user at Seoul Station makes a request for a content related to Seoul Station and goes toward Seoul City Hall. Here, if the network channel state is poor or the content playback time is too long, the content related to Seoul Station may be provided after the user has already moved to Seoul City Hall. This can be a problem.

Accordingly, it is important to enable the user on the move to readily consume information suitable for a specific location. To this end, the present disclosure proposes various embodiments.

Figure 6:
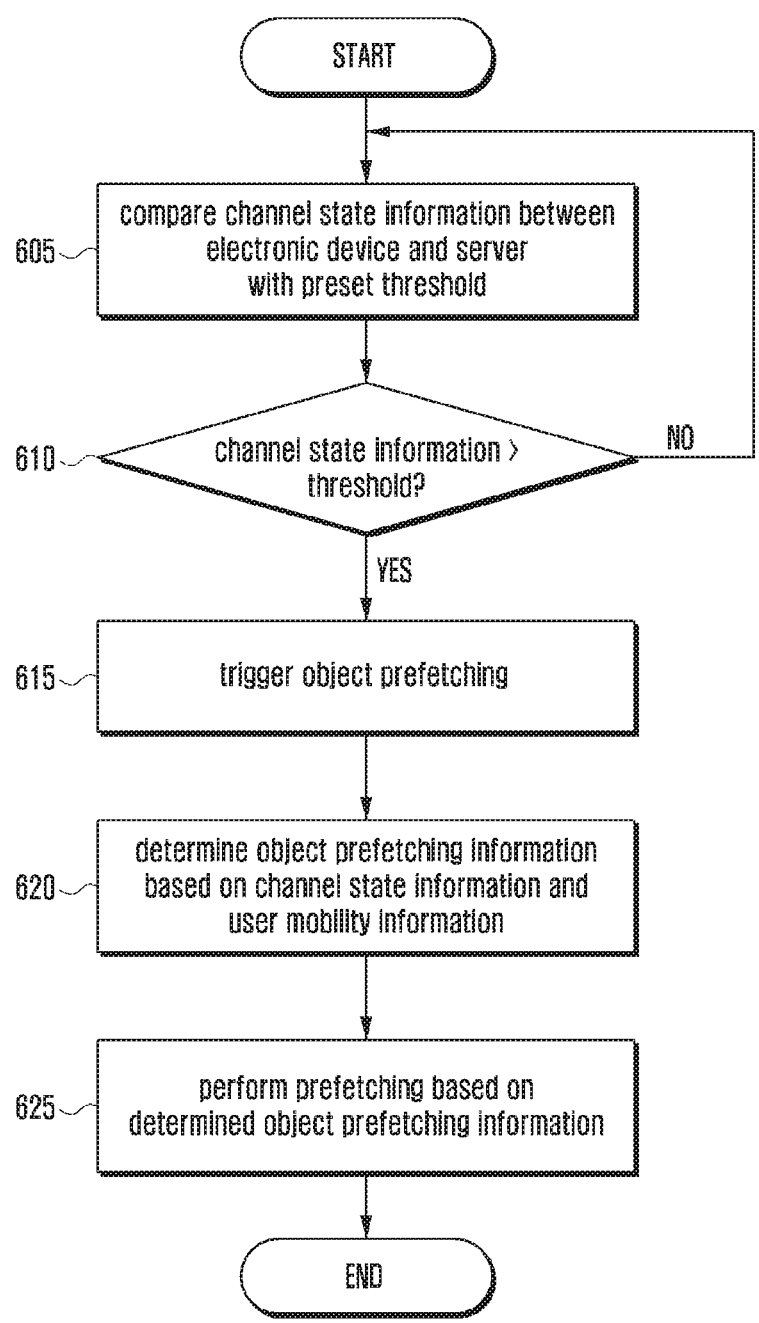
FIG. 6 illustrates a scheme for object prefetching an AR service according to an embodiment of the present disclosure.
Figure 7B:
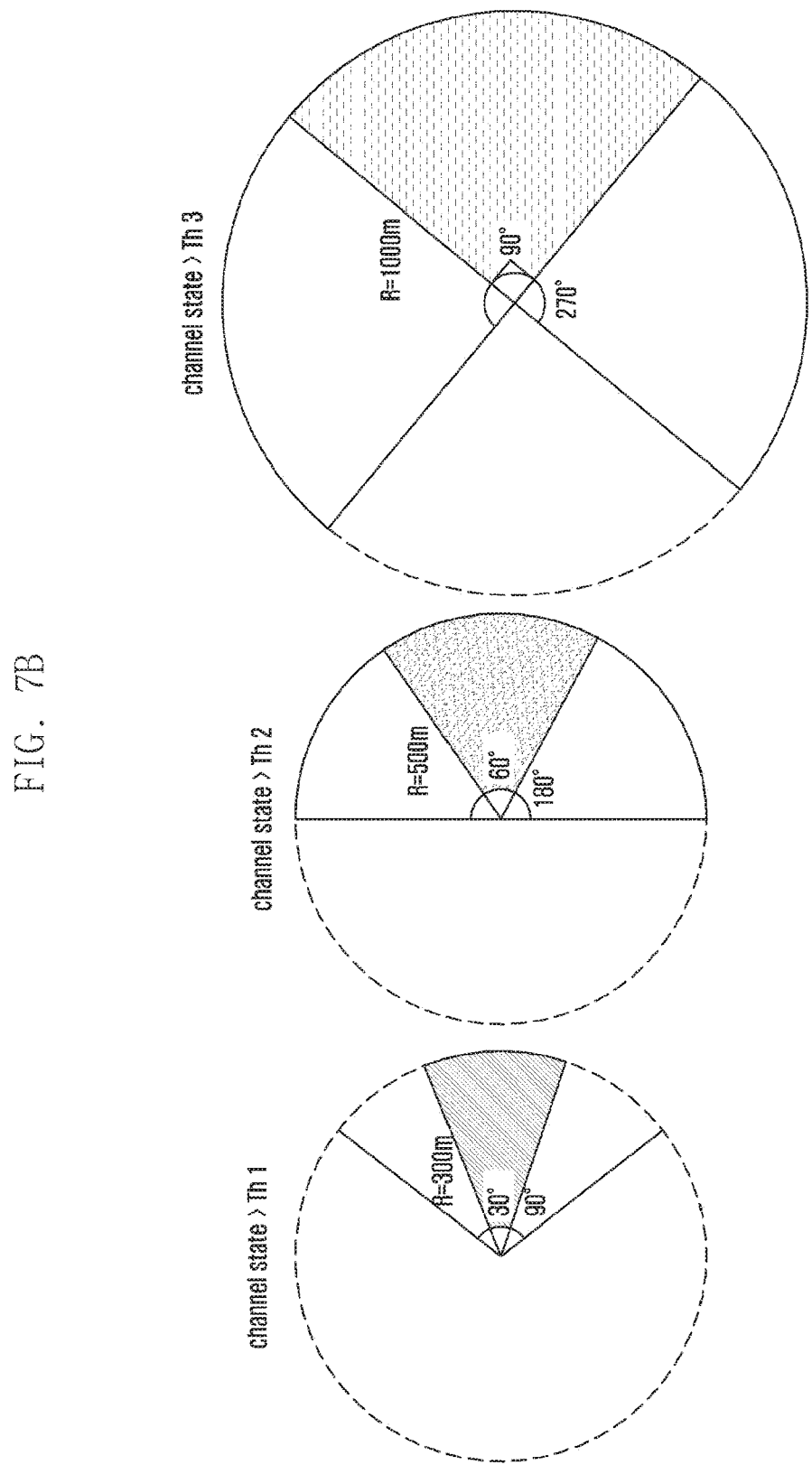
FIG. 7B illustrates object prefetching according to an embodiment of the present disclosure.

FIG. 6 illustrates a scheme for object prefetching in an AR service according to an embodiment of the present disclosure. In this embodiment, a content corresponding to a specific object may be prefetched from the server in consideration of user mobility. Object prefetching may be performed by the electronic device (e.g. electronic device 100) recognizing and tracking objects.

Referring to FIG. 6, at step 605, to determine whether to initiate object prefetching, the electronic device tries to compare the channel state information of the wireless network connection to the server with a preset threshold. At step 610, the electronic device determines whether the channel state information is greater than the preset threshold. Upon determining that the channel state information is greater than the preset threshold, at step 615, the electronic device may trigger object prefetching.

Upon triggering object prefetching, at step 620, the electronic device may determine object prefetching information on the basis of the channel state information and user mobility information. The object prefetching information may include prefetching zone information and priority related information.

While the prefetching zone information may be determined on the basis of the location, movement speed, and movement direction of the user, the prefetching zone may be widened if the channel state is good and may be narrowed if the channel state is poor. For example, referring to FIG. 7A, the prefetching zone may be defined in terms of radius and angle with respect to the location and movement direction of the user, and the prefetching zone may be determined differently for three cases where the channel state is greater than or equal to: (i) a first threshold, (ii) a second threshold, and (iii) a third threshold. In addition, the prefetching zone may be subdivided into multiple subzones on the basis of the user mobility information.

The priority related information may include information regarding priorities assigned to the individual subzones of the prefetching zone. This priority may be given in consideration of the movement direction and movement speed of the user. For example, referring to FIG. 7B, the prefetching zone is subdivided into multiple subzones, to which priorities are assigned according to the angle with respect to the movement direction (the shaded subzone has a high priority). Here, contents corresponding to an object belonging to a given subzone may be adjusted in type, size, or number according to the priority assigned to the subzone. For instance, a larger number of contents may be transmitted for an object belonging to a subzone with a high priority; a larger-sized content may be transmitted for an object belonging to a subzone with a high priority; or a content of a large-sized type such as video or hologram may be transmitted for an object belonging to a subzone with a high priority.

At step 625, the electronic device may receive contents corresponding to an object belonging to the prefetching zone on the basis of the determined object prefetching information.

The electronic device may store the received content, and, when the point in time to output the content is reached, blend the content with the corresponding object to output an AR scene.

FIG. 8 illustrates concepts for delivering low-latency content in an AR service according to an embodiment of the present disclosure.

In this embodiment, to receive contents corresponding to a recognized object from the server, the electronic device (e.g. electronic device 100) makes a request to the server to send only a content selected through filtering, reducing transmission latency.

For one object, the server may store multiple contents such as text, hologram, video, and image as indicated by indicia 800. Transmitting all contents corresponding to a given object to the electronic device may cause transmission latency.

As such, in one embodiment, contents corresponding to a given object are filtered as indicated by indicia 810 and only one or more contents selected through filtering are sent to the electronic device as indicated by indicia 820. The information considered for filtering may include at least one of capability information of the electronic device, channel state information, content playback time information, user mobility information, and content priority information.

The capability information is information indicating capabilities of the electronic device with respect to an AR service, and may include at least one of information on AR service supportability and information on the types of supported contents. Content types may include image, hologram, video, and text.

The channel state information is information indicating the connectivity state of the network leading to the server, and may include at least one of, for example, RSRP, RSRQ, and average TCP throughput. The channel state information may place a limit on the type or size of a content that can be transmitted.

The user mobility information may include information regarding the location, movement speed, and movement direction of the user. For example, it is possible to compute a critical time within which playback is to be completed on the basis of the user mobility information. Then, it is possible to select a content whose playback time is within the critical time.

The priority information is information on priorities assigned to individual contents. Priorities may be assigned according to preset settings or user input.

Meanwhile, filtering operation may be performed by the server or the electronic device. When the server performs filtering, filtering information may be sent to the server and a content selected by the server through filtering may be sent to the electronic device. When the electronic device performs filtering, the server may send information on a list of contents corresponding to an object and related information to the electronic device, the electronic device may select a content through filtering and send a request for the selected content to the server, and the server may send the requested content to the electronic device.

Figure 9:
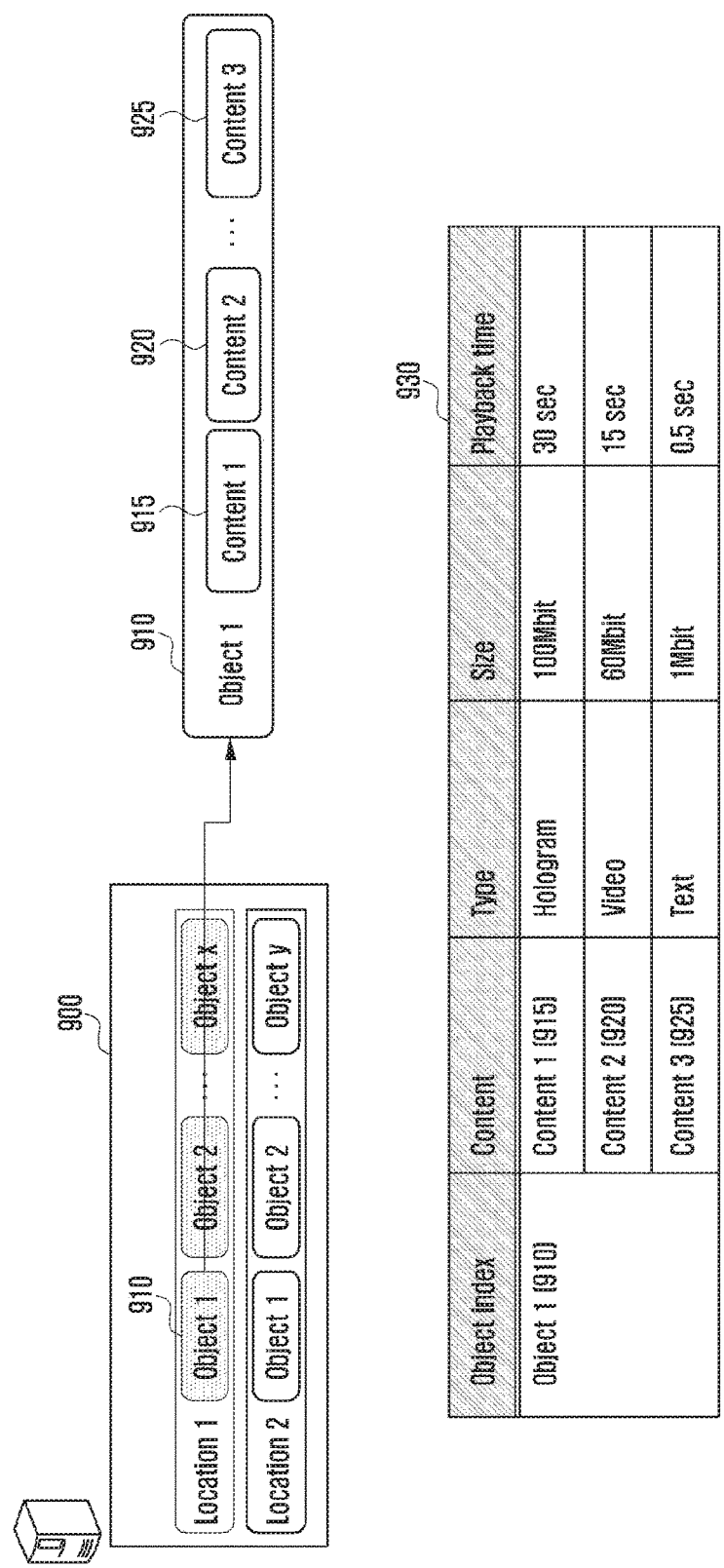
FIG. 9 illustrates objects and associated content information involved in an AR service according to an embodiment of the present disclosure.

FIG. 9 illustrates objects and associated content information involved in an AR service according to an embodiment of the present disclosure.

Referring to FIG. 9, the server may store information regarding multiple objects for each location as indicated by indicia 900. The server may store at least one content for each object. For example, multiple contents 915, 920 and 925 are stored for one object 910. The server may generate and store content related information 930 for one object. The content related information 930 corresponding to one object may include information regarding at least one of object identifier, content identifier, content type, content size, and content playback time. The server may send the content related information 930 to the electronic device upon request.

Figure 10:
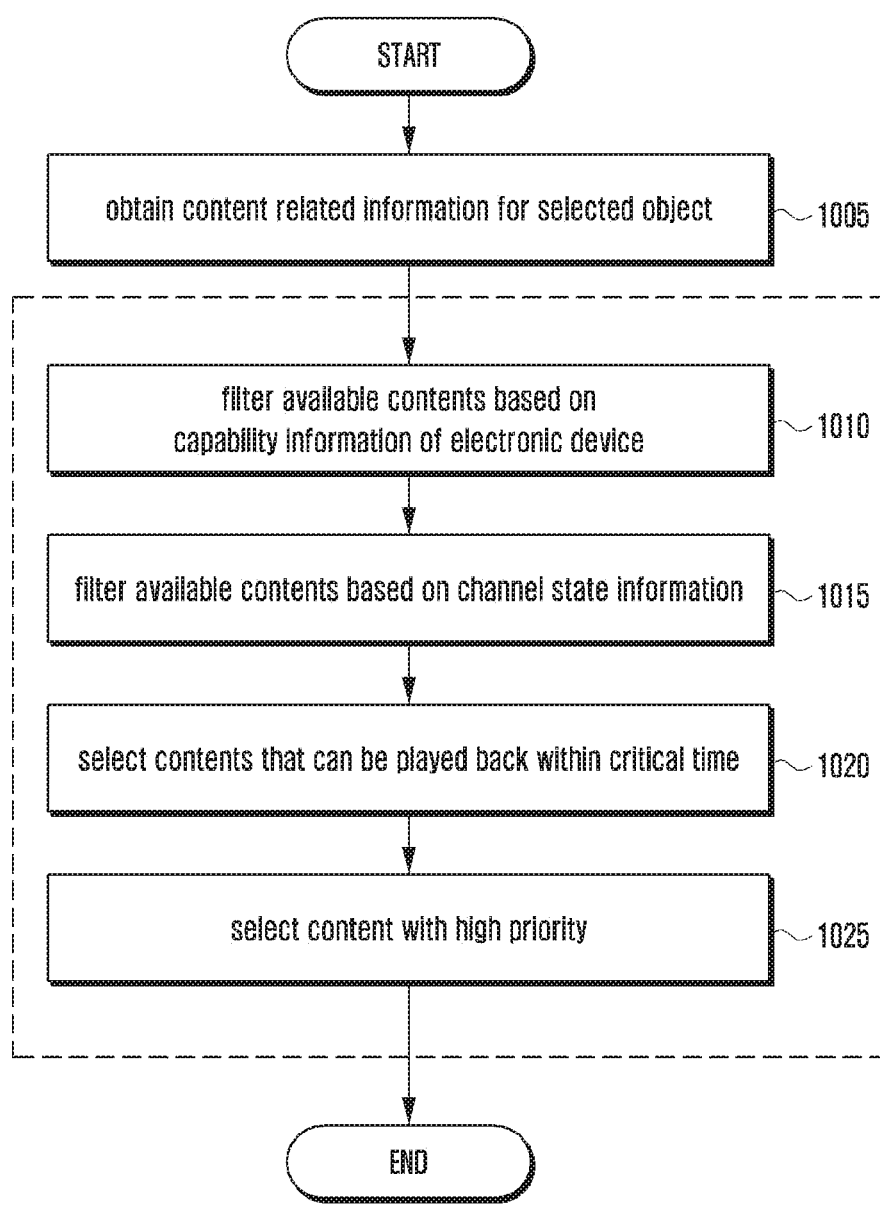
FIG. 10 illustrates a scheme for delivering low-latency content according to an embodiment of the present disclosure.

FIG. 10 illustrates a scheme for delivering low-latency content according to an embodiment of the present disclosure. In the following description, it is assumed that the electronic device (e.g. electronic device 100) performs content filtering. However, the present disclosure is not limited thereto. It will be apparent to a person skilled in the art that content filtering may also be performed by the server.

Referring to FIG. 10, at step 1005, the electronic device may obtain content related information for a selected object.

At step 1010, the electronic device may filter available contents on the basis of the capability information thereof in consideration of the content related information. For example, when the electronic device does not support hologram presentation, a hologram-type content may be excluded from selection.

At step 1015, the electronic device may filter available contents on the basis of the channel state information in consideration of the content related information. The electronic device may select a content available at the current channel state in consideration of content size and playback time. For example, the electronic device may select a specific content only when the value obtained by dividing the size of the content by the playback time of the content is less than the data rate of the current channel. Here, the data rate may be the average data rate computed for a relatively short period when the movement speed of the user is greater than a preset value, and may be the average data rate computed for a relatively long period when the movement speed of the user is less than the preset value. Instead of the data rate, the RSRQ value may be used as a parameter representing the channel state.

At step 1020, the electronic device may select contents that can be played back within the critical time in consideration of the content related information. For example, the electronic device may compute the critical time within which playback is to be completed on the basis of the user mobility information. The electronic device may determine whether a content can be played back within the critical time on the basis of the playback time of the content.

At step 1025, the electronic device may select a content according to the priority information in consideration of the content related information. The priority of a content may be determined according to user input or settings. Alternatively, the content related information may include information on the priorities of individual contents.

All filtering operations at steps 1010 to 1025 are not indispensable. At least one of the filtering operations may be performed according to embodiments.

Accordingly, the server may provide only a content selected through filtering from among those contents corresponding to an object, reducing the content transmission delay.

Figure 11:
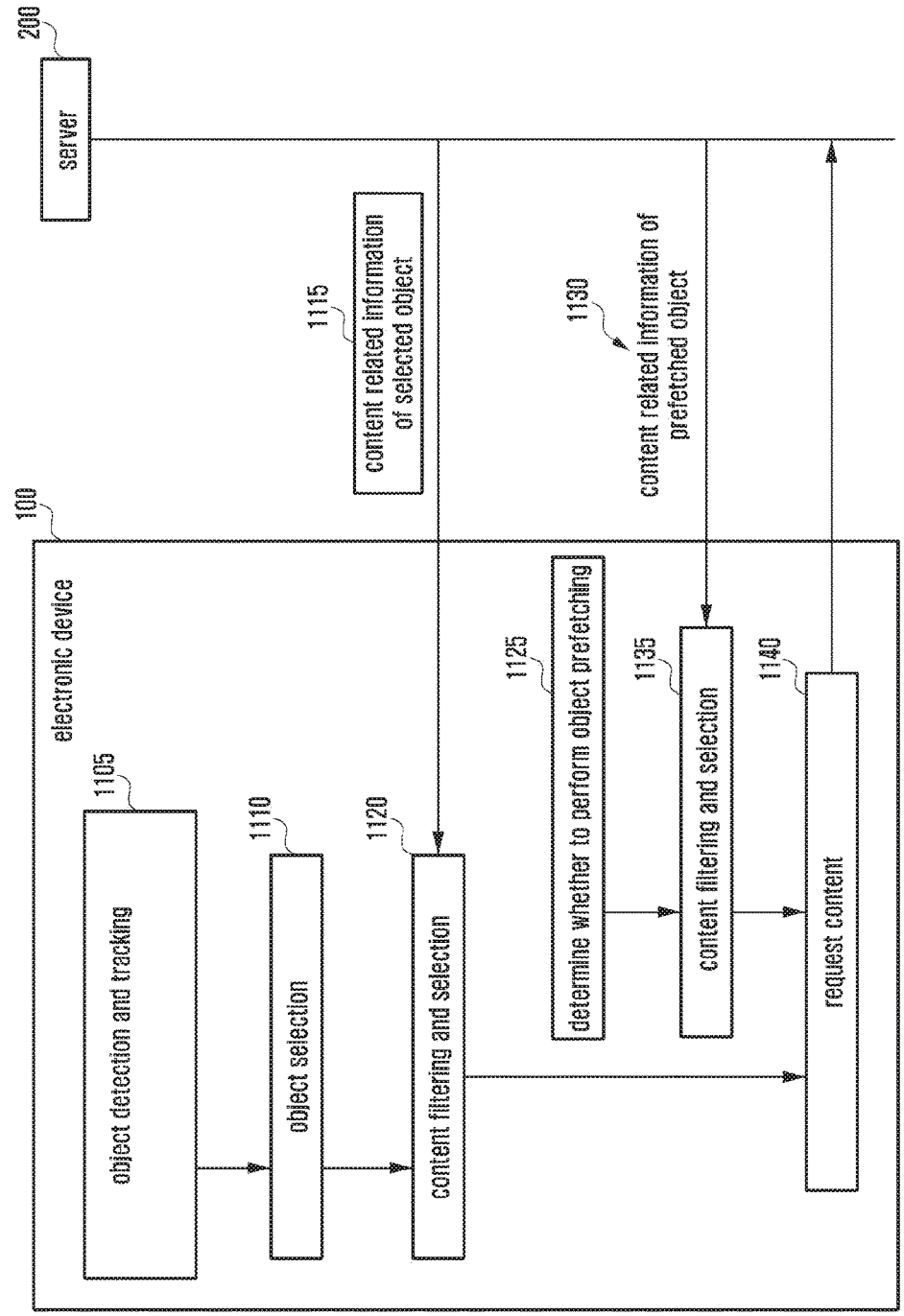
FIG. 11 illustrates operations between the electronic device and the server for delivering low-latency content according to an embodiment of the present disclosure.

FIG. 11 illustrates operations between the electronic device and the server for delivering low-latency content according to an embodiment of the present disclosure. In the following description, it is assumed that the electronic device receives content related information from the server and performs content filtering. However, the present disclosure is not limited thereto. It will be apparent to a person skilled in the art that content filtering may also be performed by the server.

Referring to FIG. 11, at step 1105, the electronic device 100 may perform object detection and tracking.

At step 1110, the electronic device 100 may select an object. When multiple objects are detected, one thereof may be selected according to a preset rule. For example, when multiple objects are recognized within the current viewing angle, the electronic device 100 may select one object according to the eye coordinates and the gaze time of the user. Specifically, the electronic device 100 may identify the pupil coordinates of the user by using a camera or other sensor. When the pupil is fixed at the coordinates for a preset time or more, the electronic device 100 may select the object corresponding to the coordinates.

At step 1115, the electronic device 100 may receive content related information for the selected object from the server 200. For example, the electronic device 100 may display tag information for each object recognized at the current location. When an input is detected (click or gaze lasting for several seconds) on the tag information of an object, the electronic device 100 may receive content related information for the object from the server 200.

At step 1120, the electronic device 100 may perform content filtering and selection according to the filtering information and content related information. This step may include at least one of the operations at steps 1010 to 1025 of FIG. 10.

At step 1140, the electronic device 100 may send the server 200 a request for the content selected through filtering and receive the content from the server 200.

Meanwhile, the electronic device 100 may perform content filtering for object prefetching, reducing the latency of content transmission.

For example, at step 1125, the electronic device 100 may determine whether to perform prefetching on the basis of the channel state information. Upon determining to perform prefetching, the electronic device 100 may perform object prefetching on the basis of the channel state information and user mobility information. Object prefetching is described in detail with reference to FIG. 6.

At step 1130, the electronic device 100 may receive content related information associated with an object selected for prefetching from the server 200.

At step 1135, the electronic device 100 may perform content filtering and selection on the basis of the filtering information and the received content related information. This step may include at least one of the operations at steps 1010 to 1025 of FIG. 10.

At step 1140, the electronic device 100 may send the server 200 a request for the content selected through filtering and receive the content from the server 200. Thereby, the electronic device 100 can reduce the latency of content transmission in object prefetching.

Figure 12:
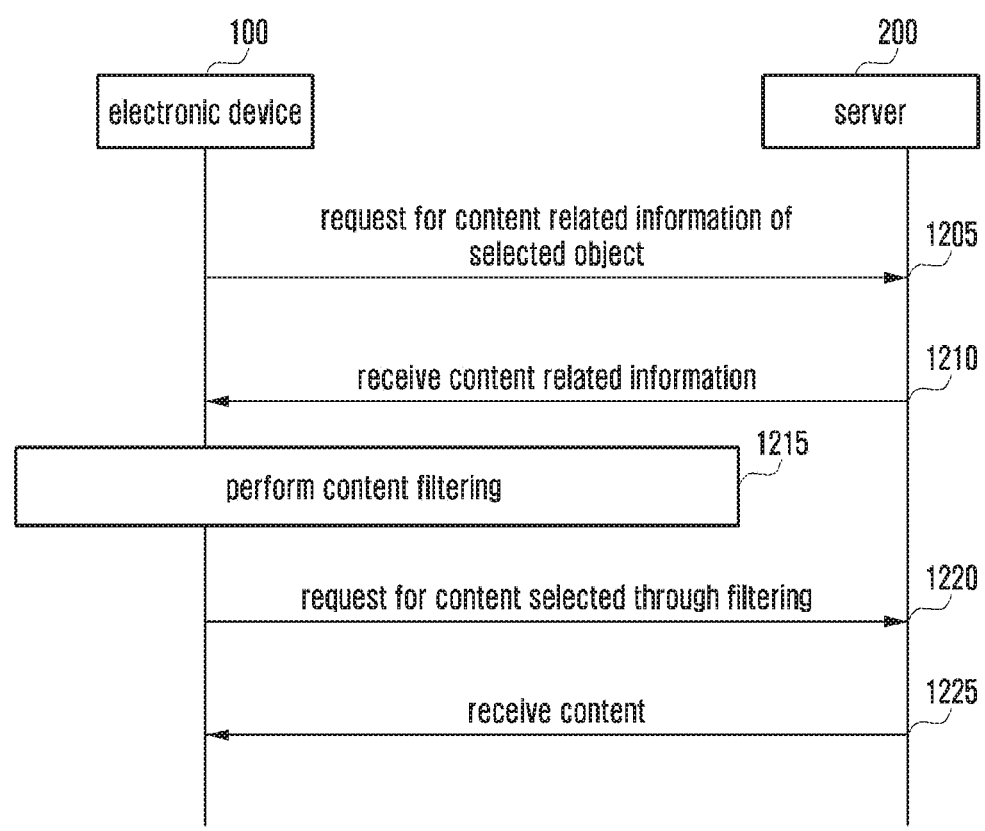
FIG. 12 illustrates a sequence diagram for delivering low-latency content according to an embodiment of the present disclosure.

FIG. 12 illustrates a sequence diagram for delivering low-latency content according to an embodiment of the present disclosure.

The electronic device 100 may select at least one object from among objects detected at a given location. To obtain a content for the selected object, at step 1205, the electronic device 100 may send the server 200 a request for content related information of the selected object. At step 1210, the electronic device 100 may receive the requested content related information from the server 200.

At step 1215, the electronic device 100 may perform content filtering and selection on the basis of the filtering information and the received content related information. This step may include at least one of the operations at steps 1010 to 1025 of FIG. 10.

At step 1220, the electronic device 100 may send the server 200 a request for the content selected through filtering. At step 1225, the electronic device 100 may receive the requested content from the server 200. Here, the server 200 may render the content, blend the rendered content with the corresponding object, and send the result to the electronic device 100. Alternatively, the electronic device 100 may render the content received from the server 200, blend the rendered content with the corresponding object, and display the result.

Figure 13:
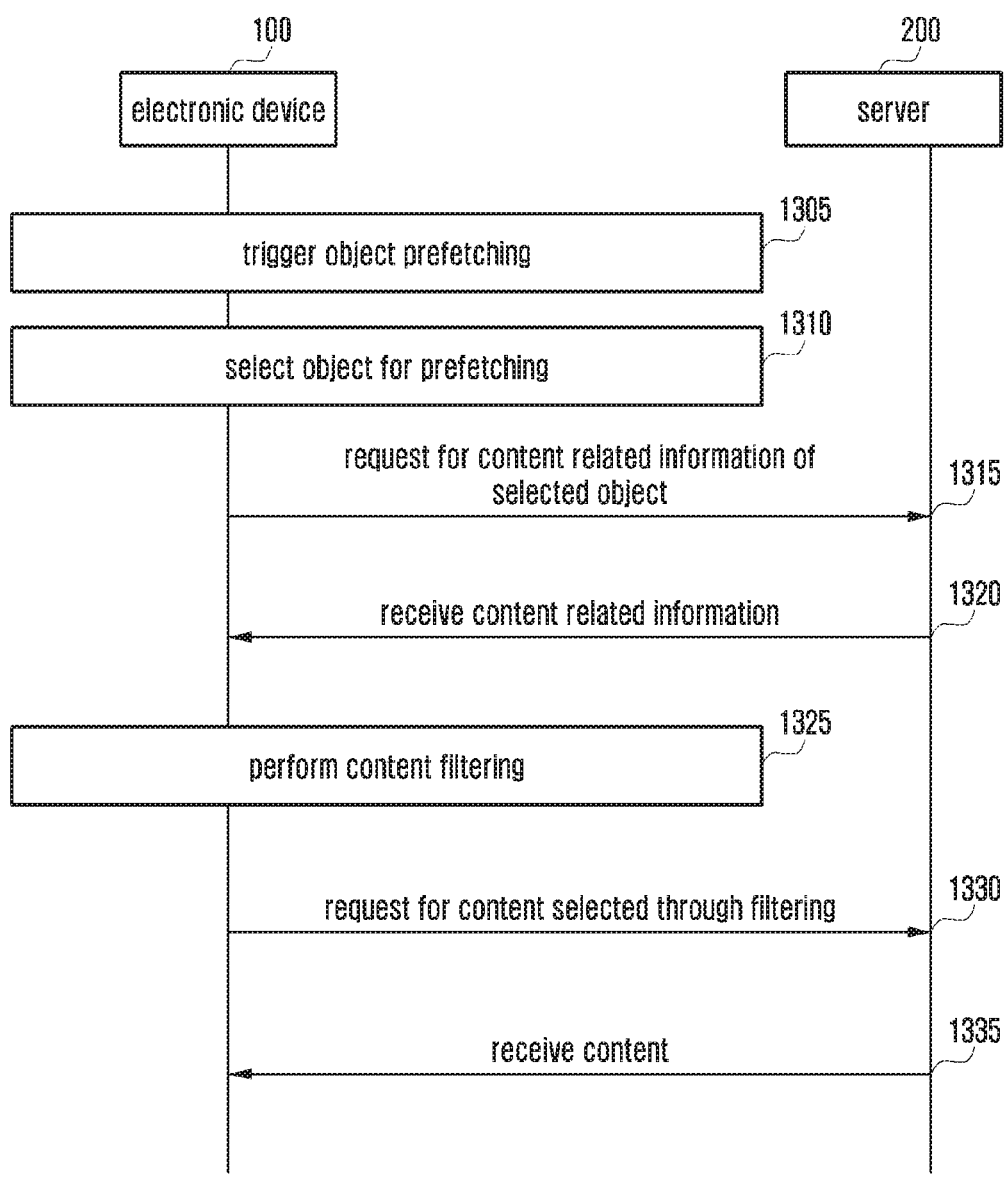
FIG. 13 illustrates a sequence diagram for delivering low-latency content in object prefetching according to an embodiment of the present disclosure.

FIG. 13 illustrates a sequence diagram for delivering low-latency content in object prefetching according to an embodiment of the present disclosure.

At step 1305, the electronic device 100 the electronic device 100 may determine whether to perform prefetching on the basis of the channel state information. For example, if the channel state information is greater than a preset threshold, the electronic device 100 may trigger object prefetching.

At step 1310, the electronic device 100 may select an object for prefetching on the basis of the channel state information and user mobility information. Operations for object prefetching may include those operations described in FIG. 6.

Upon selecting an object for prefetching, at step 1315, the electronic device 100 may send the server 200 a request for content related information of the selected object. At step 1320, the electronic device 100 may receive the requested content related information from the server 200.

At step 1325, the electronic device 100 may perform content filtering and selection on the basis of the filtering information and the received content related information. This step may include at least one of the operations at steps 1010 to 1025 of FIG. 10.

At step 1330, the electronic device 100 may send the server 200 a request for the content selected through filtering. At step 1335, the electronic device 100 may receive the requested content from the server 200. Here, the server 200 may render the content, blend the rendered content with the corresponding object, and send the result to the electronic device 100. Alternatively, the electronic device 100 may render the content received from the server 200, blend the rendered content with the corresponding object, and display the result.

Figure 14A:
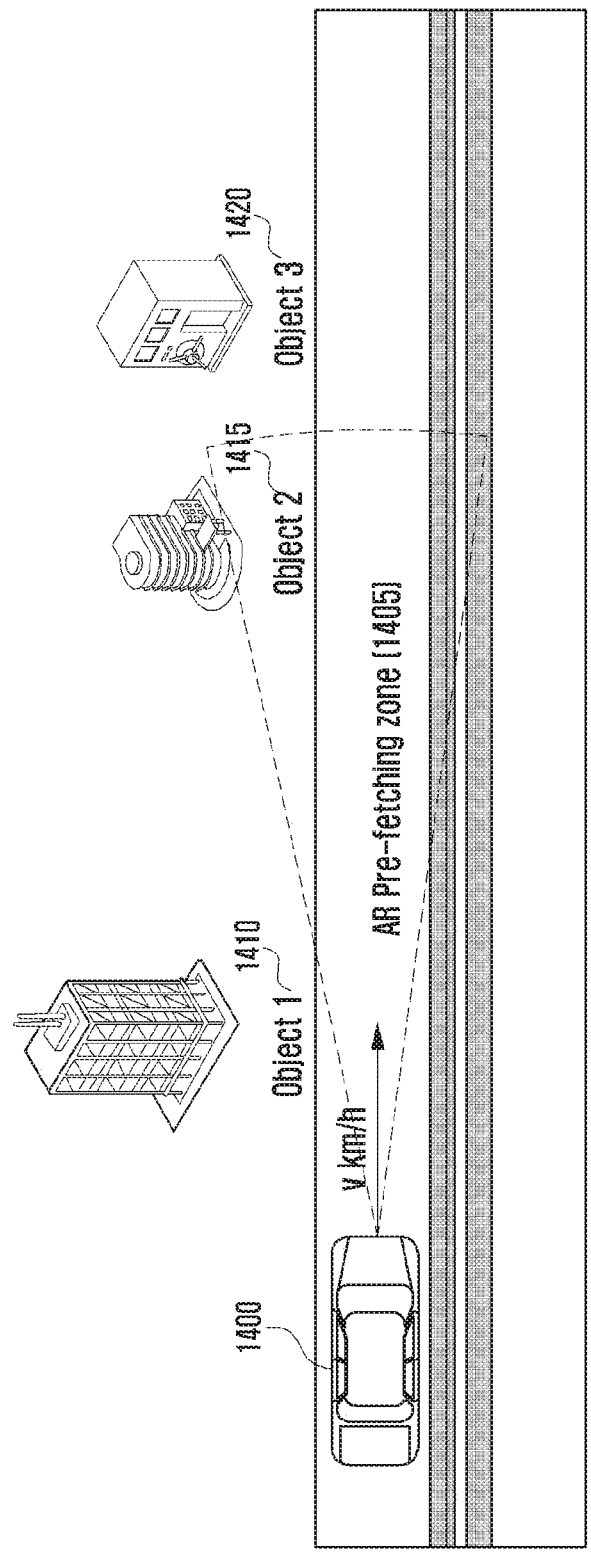
FIG. 14A illustrates an AR service application according to an embodiment of the present disclosure.

FIG. 14A illustrates object prefetching in an AR service according to an embodiment of the present disclosure.

As shown in FIG. 14A, a vehicle may carry an electronic device 1400 providing an AR service. The electronic device 1400 may determine whether to trigger object prefetching on the basis of the channel state during driving. Upon determining to trigger object prefetching, the electronic device 1400 may determine the prefetching zone 1405 on the basis of the user mobility information and channel state information. Thereafter, among multiple detected objects 1410, 1415 and 1420, the electronic device 1400 may select the object 1415 belonging to the prefetching zone 1405. The electronic device 1400 may receive a content related to the selected object 1415 in advance. Here, as described before, content filtering may be applied, reducing the latency of content transmission in receiving related contents.

Figure 14B:
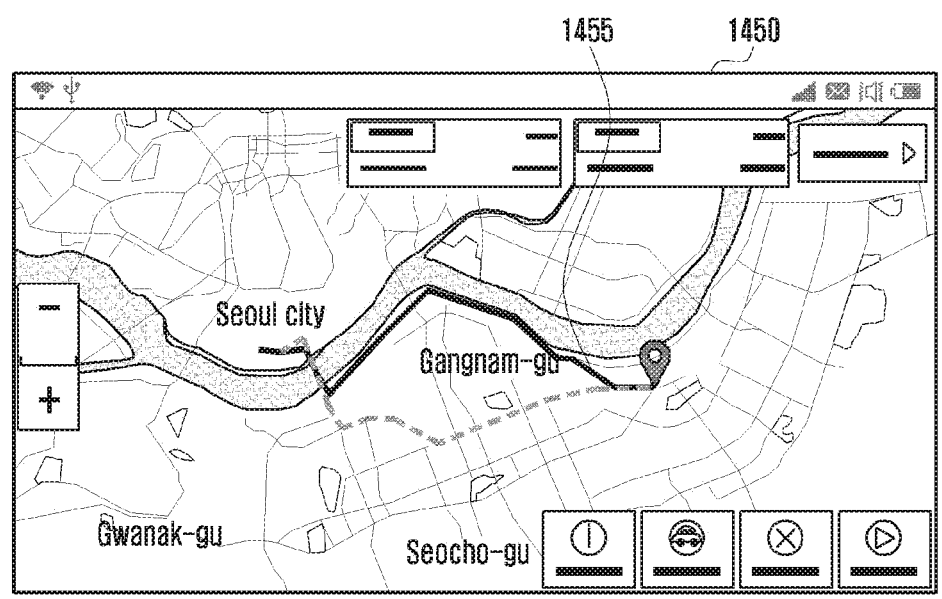
FIG. 14B illustrates an AR service application according to an embodiment of the present disclosure.

FIG. 14B is illustrates object prefetching in an AR service according to another embodiment of the present disclosure.

As shown in FIG. 14B, a vehicle may carry an electronic device, which provides a navigation aid service 1450 as an AR service. For example, the navigation aid service 1450 may present a path from the current location to the destination. Here, the electronic device may perform prefetching for an object related to the path 1455 selected by the user. In this case, prefetching may be performed for all objects along the path. Content filtering may be applied as described before, reducing the latency of content transmission in receiving contents related with the objects.

FIGS. 15A to 15D illustrate various AR service applications according to an embodiment of the present disclosure. FIGS. 15A to 15D depict various AR service based applications executed by the electronic device (e.g. electronic device 100).

Figure 15A:
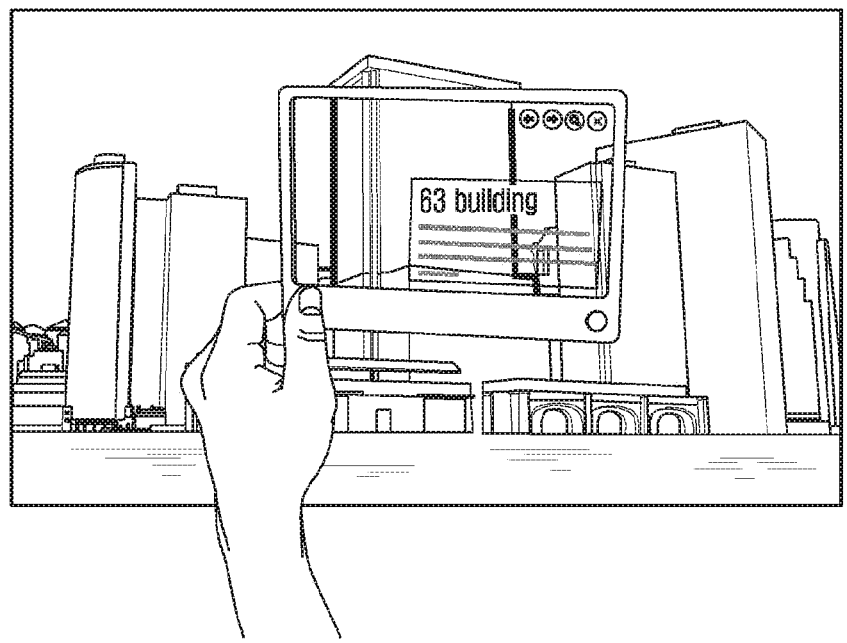
FIGS. 15A to 15D illustrates various AR service applications according to an embodiment of the present disclosure.

In FIG. 15A, the electronic device provides a tourist attraction guide service. The electronic device may capture an external image through the camera module and recognize and track a tourist spot object in the external image. The electronic device may filter contents for a selected object and receive and display a suitable content. Hence, the electronic device may provide the user with information on a nearby tourist spot.

Figure 15B:
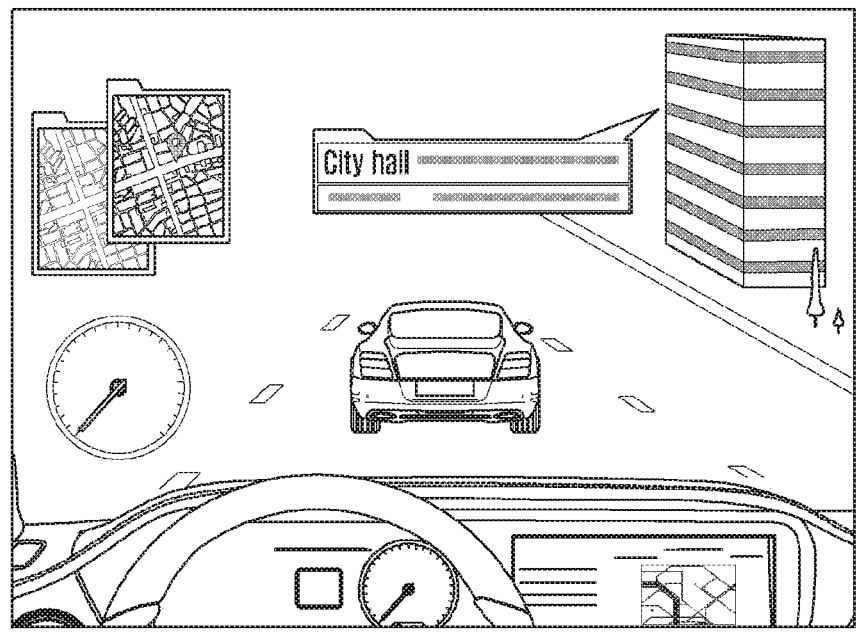

In FIG. 15B, the electronic device provides a driving related service. The electronic device may capture an external image during driving and recognize and track an object in the external image. The electronic device may filter contents for a selected object and receive and display a suitable content. Hence, the user may view information on nearby surroundings through the screen while driving.

Figure 15C:
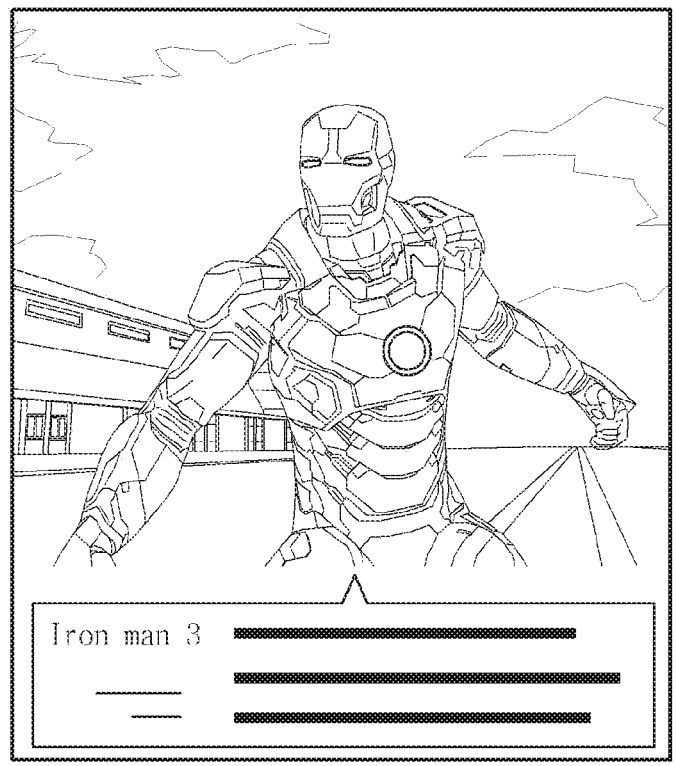

In FIG. 15C, the electronic device provides a movie information guide service. The electronic device may capture an external image (e.g. movie poster) through the camera module and recognize an object (e.g. leading actor)

in the external image. The electronic device may filter contents for a selected object and receive and display a suitable content. Here, the content may include information related to the corresponding movie.

Figure 15D:
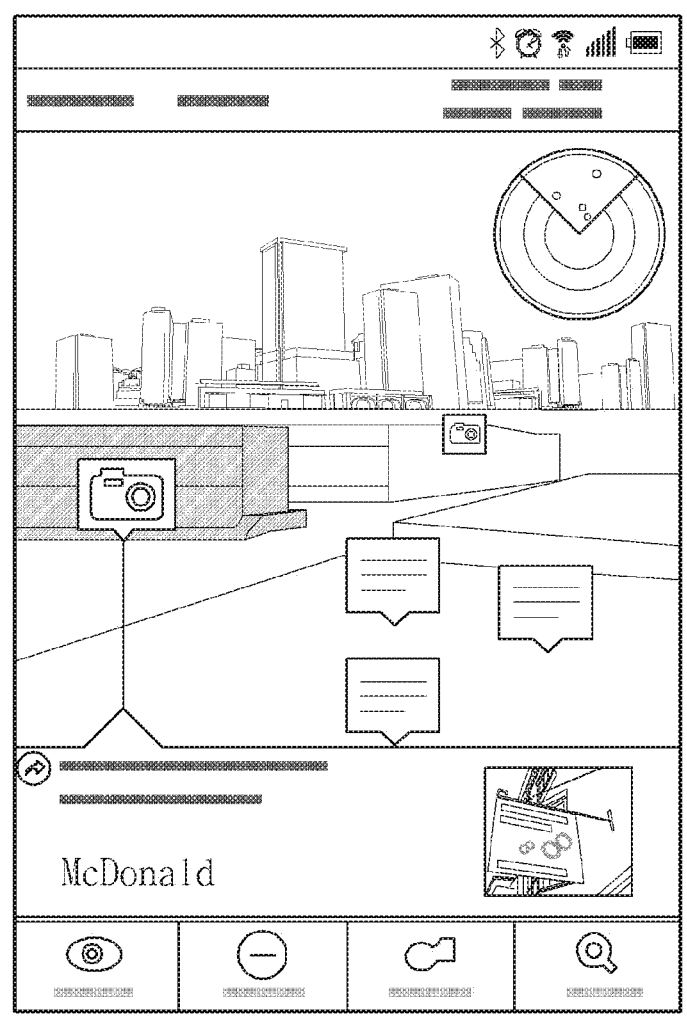

In FIG. 15D, the electronic device provides a restaurant information guide service. The electronic device may capture an external image through the camera module and recognize a restaurant object in the external image. The electronic device may filter contents for a selected object and receive and display a suitable content. Hence, the electronic device may provide the user with information on nearby restaurants.

In a feature of the present disclosure, it is possible to align the manipulated object with the line of vision of the user when AR content streaming is provided to an AR device, realizing improved interaction.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for an electronic device to provide an augmented reality (AR) service, the method comprising:
   receiving content information associated with an object selected for the AR service, wherein the content information is information describing multiple contents related to the object;
   determining at least one content to request among the multiple contents related to the object based on the received content information;
   transmitting a request for the determined at least one content;
   receiving the at least one content in response to the request; and
   outputting the received at least one content,
   wherein the at least one content is determined by filtering the multiple contents based on at least one of capability information of the electronic device, channel state information, user mobility information, and content priority information.

2. The method of claim 1, wherein the content information comprises information regarding at least one of a type, size, or playback time for each of the multiple contents related to the object.

3. The method of claim 2, wherein the transmitting the request for the determined at least one content further comprises at least one of:
   filtering available contents based on the capability information of the electronic device;
   filtering the available contents based on the channel state information;
   filtering the available contents based on the user mobility information and playback time information to select a content whose playback time is within a critical time; or
   filtering the available contents based on the content priority information.

4. The method of claim 1, further comprising triggering object prefetching based on the channel state information.

5. The method of claim 4, further comprising:
   recognizing at least one object upon triggering object prefetching; and
   selecting an object belonging to a zone determined based on user mobility information and the channel state information from among the at least one object.

6. The method of claim 5, wherein the zone determined based on the user mobility information and the channel state information is subdivided into multiple subzones, and
   the transmitting the request for the determined at least one content among the multiple contents related to the object comprises: transmitting a request for at least one content among the multiple contents related to an object belonging to a specific subzone based on priorities assigned to individual subzones.

7. The method of claim 1, wherein the at least one content includes voice data.

8. A method for a server to provide an augmented reality (AR) service, the method comprising:
   transmitting content information associated with an object selected for the AR service by an electronic device, wherein the content information is information describing multiple contents related to the object;
   receiving a request for at least one content, if the at least one content among the multiple contents related to the object based on the transmitted content information is determined; and
   transmitting the at least one content to the electronic device in response to the request,
   wherein the at least one content is determined, by the electronic device, by filtering the multiple contents based on at least one of capability information of the electronic device, channel state information, user mobility information, and content priority information.

9. The method of claim 8, wherein the content information comprises information regarding at least one of a type, size, or playback time for each of the multiple contents related to the object.

10. The method of claim 8, wherein the at least one content includes voice data.

11. An electronic device capable of providing an augmented reality (AR) service, comprising:
    a display;
    a communicator; and
    a processor electrically connected with the display and the communicator, the processor configured to:
      control the communicator to receive content information associated with an object selected for the AR service, wherein the content information is information describing multiple contents related to the object,
      determine at least one content among the multiple contents related to the object based on the received content information,
      control the communicator to transmit a request for the determined at least one content,
      control the communicator to receive the at least one content in response to the request, and
      output the received at least one content,
      wherein the at least one content is determined by filtering the multiple contents based on at least one of capability information of the electronic device, channel state information, user mobility information, and content priority information.

12. The electronic device of claim 11, wherein the content information comprises information regarding at least one of a type, size, or playback time for each of the multiple contents related to the object.

13. The electronic device of claim 11, wherein, to select the at least one content from among the multiple contents, the processor is further configured to perform at least one of filtering available contents based on capability information of the electronic device, filtering the available contents based on channel state information, filtering the available contents based on the user mobility information and playback time information to select a content whose playback time is within a critical time, or filtering the available contents based on content priority information.

14. The electronic device of claim 11, wherein the processor is further configured to trigger object prefetching based on the channel state information.

15. The electronic device of claim 14, wherein the processor is further configured to recognize at least one object upon triggering object prefetching, and select an object belonging to a zone determined based on user mobility information and the channel state information from among the at least one object.

16. The electronic device of claim 15, wherein the zone determined based on the user mobility information and the channel state information is subdivided into multiple subzones, and
wherein the processor is further configured to control the communicator to transmit the request for the determined at least one content among the multiple contents related to an object belonging to a specific subzone based on priorities assigned to individual subzones.

17. The electronic device of claim 11, wherein the at least one content includes voice data and the electronic device further comprises an audio outputter configured to output the voice data.

18. A server capable of providing an augmented reality (AR) service, comprising:
a communicator; and
a processor electrically connected with the communicator and configured to:
control the communicator to transmit content information associated with an object selected for the AR service by an electronic device, wherein the content information is information describing multiple contents related to the object,
control the communicator to receive a request for at least one content, if the at least one content among the multiple contents related to the object based on the transmitted content information is determined,
control the communicator to transmit the at least one content to the electronic device in response to the request,
wherein the at least one content is determined, by the electronic device, by filtering the multiple contents based on at least one of capability information of the electronic device, channel state information, user mobility information, and content priority information.

19. The server of claim 18, wherein the content information comprises information regarding at least one of a type, size, or playback time for each of the multiple contents related to the object.

20. The server of claim 18, wherein the at least one content includes voice data.

* * * * *